(12) United States Patent
Yuen et al.

(10) Patent No.: US 8,438,066 B1
(45) Date of Patent: May 7, 2013

(54) SECURE GEO-FENCING WITH MULTI-FORM AUTHENTICATION

(75) Inventors: Billy Yuen, Mountain View, CA (US); Ray Yiu Ming Lai, Palo Alto, CA (US)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 13/536,893

(22) Filed: Jun. 28, 2012

(51) Int. Cl.
*G06Q 20/00* (2006.01)

(52) U.S. Cl.
USPC .............................. 705/21; 705/16

(58) Field of Classification Search ........... 705/5, 30, 705/44; 235/379, 380
See application file for complete search history.

(56) References Cited

U.S. PATENT DOCUMENTS

| 2009/0006254 A1* | 1/2009 | Mumm et al. ............... 705/44 |
| 2009/0182634 A1* | 7/2009 | Park et al. .................. 705/14 |
| 2012/0054046 A1* | 3/2012 | Albisu ....................... 705/16 |
| 2012/0173348 A1* | 7/2012 | Yoo et al. ................... 705/16 |

OTHER PUBLICATIONS

Hafner, Katie. "Wireless Payment Systems might Mean Dialing Inot Your Own Wallet." New York Times: 0. Mar. 2, 2000. Hoover's Company Profiles; ProQuest Central. Web. Jan. 13, 2013.*

Kahn, J., "Square Card Case Update Brings Hands-Free Payments with iOS 5 Geofencing," 9to5mac.com/2011/11/02/square-card-case-update-brings-hands-free-payments-with-ios-5-geofencing/, Nov. 2, 2011 (1 page).

* cited by examiner

*Primary Examiner* — Matthew Gart
*Assistant Examiner* — Rokib Masud
(74) *Attorney, Agent, or Firm* — Osha Liang LLP

(57) ABSTRACT

A method for authenticating a geo-fencing payment, including receiving based on a wireless protocol of the geo-fencing payment, a payment account number associated with a mobile device of a consumer, wherein the payment account number is sent automatically to a POS device without user intervention when the mobile device is within a pre-determined range of the POS device, receiving a security code and an identifier of a merchandise that are inputted into the POS device by the consumer, determining that the mobile device is within the pre-determined range when the security code and the identifier are received, submitting, to a computer server, a merchandise order comprising a payment amount, the payment account number, and the security code, and receiving an authorization from the computer server to release the merchandise to the consumer based on a consumer profile of the consumer stored in the computer server.

20 Claims, 6 Drawing Sheets

SECURE GEO-FENCING WITH MULTI-FORM AUTHENTICATION

BACKGROUND

The term "digital wallet" refers to mobile phones, especially smartphones, that store an individual's credentials and utilize wireless technologies such as near field communication (NFC) to carry out financial transactions. For example, the individual's credit card number can be passed to a merchant's terminal wirelessly via NFC.

Geo-fencing refers to a digital wallet payment method utilizing longer range wireless technologies. Payments made using the geo-fencing payment method are referred to as geo-fencing payments. For example, the individual's credit card number can be passed to a merchant's terminal wirelessly when the individual is in proximity (e.g., 100 meters). Geo-fencing enables consumers to make payment without taking anything out of their pockets or wallets. However, it can be insecure to use this technology to pay because unauthorized users can steal a phone and make fraudulent payments.

SUMMARY

In general, in one aspect, the invention relates to a method for authenticating a geo-fencing payment. The method includes receiving, by a point-of-sale (POS) device based on a wireless protocol of the geo-fencing payment, a first payment account number associated with a first mobile device of a first consumer, wherein the first payment account number is sent automatically to the POS device without user intervention when the first mobile device is within a pre-determined range of the POS device, wherein the pre-determined range is based on the wireless protocol of the geo-fencing payment, receiving, by the POS device, a security code and an identifier of a merchandise that are inputted into the POS device by the first consumer, determining that the first mobile device is within the pre-determined range when the security code and the identifier of the merchandise are received, submitting, by the POS device, to a computer server and in response to the determining, a first merchandise order comprising a payment amount of the merchandise, the first payment account number, and the security code, and receiving, by the POS device and in response to submitting the first merchandise order, an authorization to release the merchandise to the first consumer, wherein the authorization is received from the computer server in response to processing the geo-fencing payment to pay for the first merchandise based on the first payment account number, and wherein the geo-fencing payment is authenticated by matching the first payment account number and the security code based on a first consumer profile of the first consumer stored in the computer server.

In general, in one aspect, the invention relates to a system for authenticating a geo-fencing payment. The system includes a first mobile device of a first consumer, configured to send the geo-fencing payment, a point-of-sale (POS) device coupled to a computer server and configured to (i) receive, based on a wireless protocol of the geo-fencing payment, a first payment account number from a first mobile device, wherein the first payment account number is sent to the POS device automatically without user intervention when the first mobile device is within a pre-determined range of the POS device, wherein the pre-determined range is based on the wireless protocol of the geo-fencing payment, (ii) receive a security code and an identifier of a merchandise that are inputted into the POS device by the first consumer, (iii) determine that the first mobile device is within the pre-determined range when the security code and the identifier of the merchandise is received, (iv) submit, to a computer server and in response to the determining, a first merchandise order comprising a payment amount of the merchandise, the first payment account number, and the security code, and (v) receive, from the computer server and in response to submitting the first merchandise order, an authorization to release the merchandise to the first consumer, and the computer server configured to process the geo-fencing payment by (vi) authenticating the geo-fencing payment by matching the first payment account number and the security code based on a first consumer profile of the first consumer stored in the computer server, and (vii) sending the authorization in response to processing the geo-fencing payment based on the first payment account number to pay for the first merchandise.

In general, in one aspect, the invention relates to a non-transitory computer readable medium storing instructions for authenticating a geo-fencing payment. The instructions, when executed by a computer processor, include functionality to receive, by a point-of-sale (POS) device based on a wireless protocol of the geo-fencing payment, a first payment account number associated with a first mobile device of a first consumer, wherein the first payment account number is sent automatically to the POS device without user intervention when the first mobile device is within a pre-determined range of the POS device, wherein the pre-determined range is based on the wireless protocol of the geo-fencing payment, receive, by the POS device, a security code and an identifier of a merchandise that are inputted into the POS device by the first consumer, determine that the first mobile device is within the pre-determined range when the security code and the identifier of the merchandise are received, submit, by the POS device, to a computer server and in response to the determining, a first merchandise order comprising a payment amount of the merchandise, the first payment account number, and the security code, and receive, by the POS device and in response to submitting the first merchandise order, an authorization to release the merchandise to the first consumer, wherein the authorization is received from the computer server in response to processing the geo-fencing payment to pay for the first merchandise based on the first payment account number, and wherein the geo-fencing payment is authenticated by matching the first payment account number and the security code based on a first consumer profile of the first consumer stored in the computer server.

Other aspects of the invention will be apparent from the following detailed description and the appended claims.

DETAILED DESCRIPTION

Figure 1:
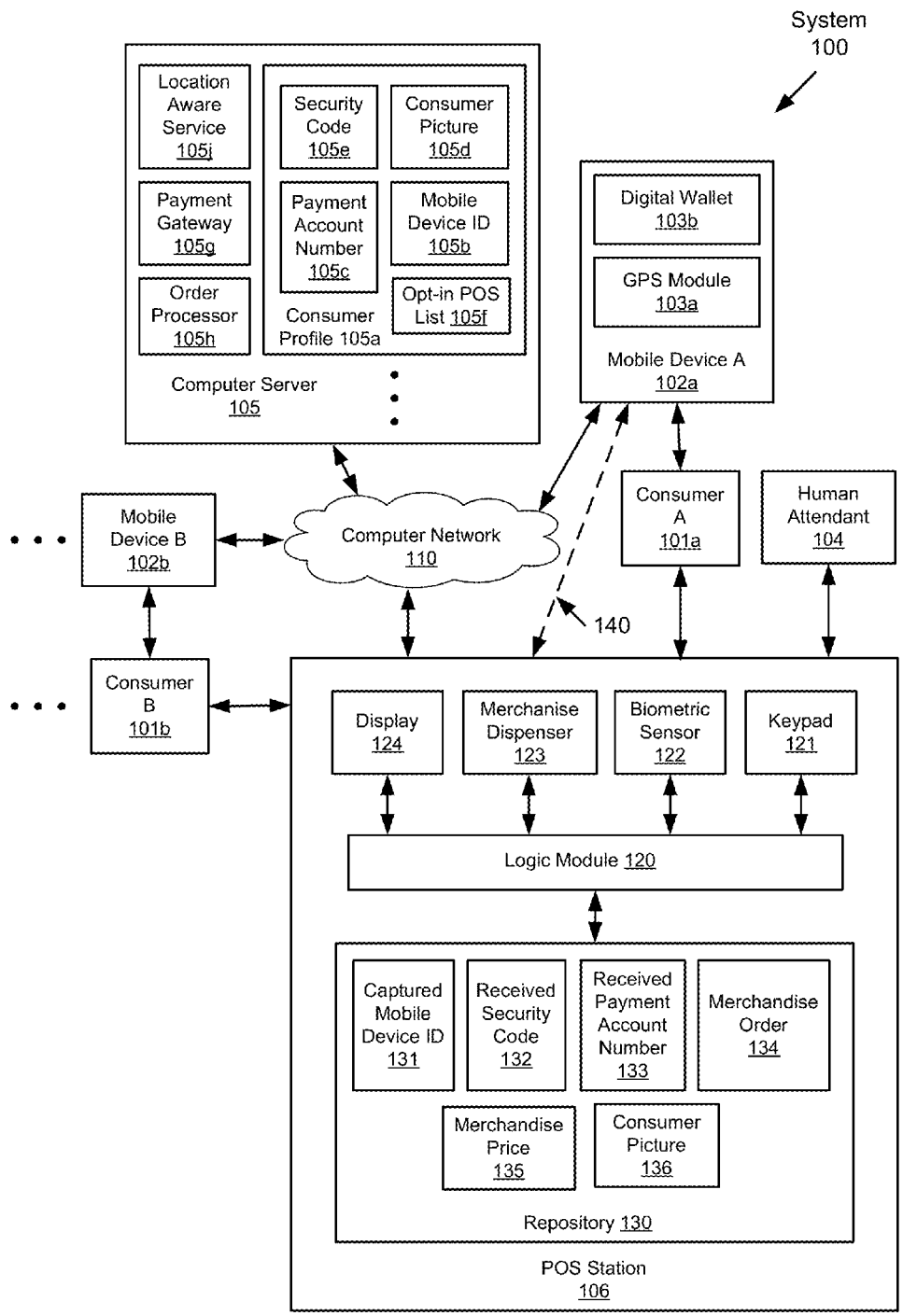
FIG. 1 shows a schematic diagram of a system of secured geo-fencing with multi-form authentication in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a system and a method for a merchant to verify an opt-in consumer's identity during a purchase transaction using geo-fencing payment. The purchase transaction may be made at a cashier attended point of sale (POS) or other unattended POS, such as a self-checkout counter or a vending machine. The consumer's identity is verified by combining the proximity of the user to the POS, a user picture (e.g., an electronic image of the consumer previously associated with the consumer's identity and stored in the merchant's system/POS), a unique identifier of the consumer's mobile device (e.g., International Mobile Equipment Identity (IMEI) number), and pin number or other security code, such as a biometric signature. Custom security rules can also be added to restrict purchase. For example, purchase using geo-fencing payment may be restricted to previously purchased items only.

To enable the geo-fencing payment for a POS, the consumer is required to opt-in by registering the POS information (e.g., merchant identity, location, etc.) under a consumer's account in a geo-fencing system of the merchant or a third party geo-fencing service provider. The registration may be done by entering the POS information using a consumer's device (e.g., smartphone, notebook computer, etc.) to log into the geo-fencing system or by checking-in the consumer's smartphone using a kiosk in a store. Once the user has opted-in, the POS can detect the user in proximity (e.g., in the store or near a vending machine) based on geo-location (i.e., geographical position) of the consumer via the consumer's smartphone.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be limited to the specific arrangements of modules shown in FIG. 1.

As shown in FIG. 1, the system (100) includes consumers (e.g., consumer A (101a) having mobile device A (102a), consumer B (101b) having mobile device B (102b), etc.) making purchases at the POS station (106) using geo-fencing payments. The POS station (106) and consumers' mobile devices (i.e., mobile device A (102a), mobile device B (102b), etc.) are coupled to the computer server (105) via the computer network (110) to enable the geo-fencing payment service. For example, the computer network (110) may include wired and/or wireless portions of public and/or private data networks, such as wide area networks (WANs), local area networks (LANs), Internet, etc., as well as a wireless communication network, such as a mobile phone network.

In one or more embodiments, the POS station (106) includes the logic module (120) that controls the keypad (121), biometric sensor (122), merchandise dispenser (123), and display (124). In one or more embodiments, the repository (130) may include a disk storage device, a semiconductor memory device, other suitable computer data storage, or combinations thereof. In one or more embodiments, the repository (130) is configured to store information for use by the logic module (120) to process geo-fencing payments. Such information may include captured mobile device ID (131), received security code (132), received payment account number (133), merchandise order (134), merchandise price (135), and consumer picture (136).

In one or more embodiments, the computer server (105) includes the location aware service (105j), payment gateway (105g), order processor (105h), and information of consumers who have registered to use the geo-fencing payment service. The registered consumer information is stored in the computer server (105) as consumer profiles. For example, the consumer profile (105a) corresponds to consumer A (101a) and includes a consumer picture (105d), mobile device ID (105b), security code (105e), payment account number (105c), and opt-in POS list (105f) that are inputted by the consumer A (101a) for completing the registration. In addition, the mobile device A (102a) includes a GPS module (103a) and a digital wallet (103b) that are used to send the geo-fencing payment. In one or more embodiments, a human attendant (104) is associated with the POS station (106). For example, the human attendant (104) may be dedicated to operate the POS station (106), such as an in-store checkout counter. In another example, the human attendant (104) may be monitoring multiple POS stations including the POS station (106), such as a plurality of self-checkout counters. In one or more embodiments, the human attendant (104) is not present or required at the POS station (106), such as in the scenario where the POS station (106) is a vending machine. In one or more embodiments, the location aware service (105j), payment gateway (105g), order processor (105h), and the logic module (120) may include software, hardware, firmware, or combinations thereof to process geo-fencing payments with improved security.

In one or more embodiments, the logic module (120) is configured to receive a payment account number from the mobile device A (102a). In one or more embodiments, the payment account number is received based on a wireless protocol of the geo-fencing payment. Specifically, the payment account number is sent to the POS station (106) automatically without user intervention when the mobile device A (102a) is within a pre-determined distance (e.g., 1 m, 10 m, 100 m, etc., referred to as a geo-fence) of the POS station (106). In particular, the pre-determined distance is based on the wireless protocol of the geo-fencing payment and is referred to as the pre-determined range of the geo-fencing payment. In one or more embodiments, the payment account number sent by the mobile device A (102a) is pre-stored in the digital wallet (103b) and is the same as the payment account number (105c) registered in the consumer profile (105a). In one or more embodiments, the payment account number is sent only if the consumer A (101a) has previously opted-in with the POS station (106) for using geo-fencing payment. After being received by the logic module (120), the payment account number is stored in the repository (130) as the received payment account number (133). Additional details of the wireless protocol are described below with respect to three example implementations of the geo-fencing payment.

In one or more embodiments, the logic module (120) is configured to receive a security code and an identifier of a merchandise using an input device, such as the keypad (121) or the biometric sensor (122). In one or more embodiments, the security code is an alphanumeric code inputted by the consumer A (101a) using the keypad (121) or a biometric signature (e.g., a fingerprint, a voice signature, etc.) captured from the consumer A (101a) using the biometric sensor (122). In particular, the inputted or captured security code is saved in the repository (130) as the received security code (132). The received security code (132) needs to be the same as the security code (105e) registered in the consumer profile (105a) for the geo-fencing payment to be authenticated.

In one or more embodiments, the identifier of a merchandise is inputted into the POS station (106) by the consumer A (101a). For example, the merchandise inside a vending machine (i.e., POS station (106)) may be selected for purchase by the consumer A (101a) using the keypad (121) on the vending machine. In another example, the consumer A (101a) may orient a barcode of the merchandise toward a scanner at a self-checkout counter (i.e., POS station (106)). In one or more embodiments, the identifier of a merchandise is inputted (e.g., scanned) into the POS station (106) by the human attendant (104) for the consumer A (101a), such as the case at a in-store checkout counter operated by the human attendant (104). Accordingly, the merchandise price (135) is looked up by the logic module (120) based on the inputted identifier of the merchandise.

In one or more embodiments, the logic module (120) is configured to determine that the mobile device A (102a) is within the geo-fence with respect to the POS station (106) for geo-fencing payment when the aforementioned security code and the identifier of the merchandise are received. Specifically, the determination is based on the wireless protocol of the geo-fencing payment, which allows the POS station (106) to be notified when the mobile device A (102a) (therefore the consumer A (101a)) enters and exits the pre-determined range or geo-fence. Said in other words, the security code and the identifier of the merchandise are received prior to the mobile device A (102a) exiting the pre-determined range. Three examples of determining that the mobile device A (102a) is within the pre-determined range are described below. In each example, the payment account number is sent to the POS station (106). When there are multiple mobile devices within the pre-determined range, more than one payment account number may be sent to the POS station (106). Generally, one of these multiple payment account numbers is authenticated based on the security code inputted while the corresponding mobile device is still within the pre-determined range. Thus, the security code and the payment account number received by the POS station (106) are matched for authentication before the mobile device associated with the payment account number exits the geo-fence.

In the first example, the POS station (106) is configured to detect the mobile device A (102a) within the pre-determined range based on the wireless protocol, such as Bluetooth protocol, WiFi-Direct protocol, or other suitable short range wireless communication protocol. For example, the mobile device A (102a) and the POS station (106) may include suitable wireless modules (not shown) to support the necessary protocol communication (140) among them.

Once the mobile device A (102a) is detected, the logic module (120) communicates with the computer server (105) to confirm pre-authorization to accept the geo-fencing payment from the mobile device A (102a). The pre-authorization means that the consumer A (101a) has previously opted-in the POS station (106) to accept geo-fencing payment from the mobile device A (102a). The pre-authorization may be based on the opt-in POS list (105f), which lists all POS stations that are registered by the consumer A (101a) as pre-authorized to accept the geo-fencing payment. For example, the consumer A (101a) has previously opted-into the POS station (106) such that the opt-in POS list (105f) in the consumer profile (105a) includes an identifier or a geo-location of the POS station (106). In addition, the identifier of mobile device A (102a) is captured by the logic module (120) when mobile device A (102a) is detected and is stored in the repository as the captured mobile device ID (131). Accordingly, the logic module (120) first identifies the consumer profile (105a) by matching the captured mobile device ID (131) to the mobile device ID (105b) in the consumer profile (105a). Then the logic module (120) confirms the pre-authorization if the identifier or geo-location of the POS station (106) (known to the logic module (120)) is matched to an entry in the opt-in POS list (105f). In one or more embodiments, information regarding all mobile devices that have opted-in the POS station (106) may be downloaded and stored in the repository (130) such that the pre-authorization may be determined locally by the logic module (120).

In response to confirming the pre-authorization, the logic module (120) requests a payment method from the mobile device A (102a). For example, the request may be based on the same wireless protocol described above. As noted above, the payment account number is stored in the digital wallet (103b) of the mobile device A (102a) and is sent by the mobile device A (102a) to the POS station (106) in response to this request.

In the second example of determining that the mobile device A (102a) is within the pre-determined range, the mobile device A (102a) is configured to detect the POS station (106) when the mobile device A (102a) is within the pre-determined range. For example, the detection may be based on a wireless protocol, such as Bluetooth protocol, WiFi-Direct protocol, or other suitable short range wireless communication protocol. Similar to the first example, the mobile device A (102a) and the POS station (106) may include suitable wireless modules (not shown) to support the necessary protocol communication (140) among them.

Once the POS station (106) is detected, the mobile device A (102a) communicates with the computer server (105) to confirm pre-authorization to send the geo-fencing payment to the POS station (106). As noted above, the pre-authorization means that the consumer A (101a) has previously opted-into the POS station (106) to accept geo-fencing payment. For example, the consumer A (101a) has previously opted-in the POS station (106) such that the opt-in POS list (105f) in the consume profile (105a) includes a geo-location of the POS station (106). In addition, the geo-location of POS station (106) is captured by the mobile device A (102a) using the GPS module (103a) when the POS station (106) is detected. Accordingly, mobile device A (102a) confirms the pre-authorization if the captured geo-location of the POS station (106) can be matched to an entry in the opt-in POS list (105f). In one or more embodiments, a copy of the opt-in POS list (105f) may be downloaded and stored in the mobile device A (102a) such that the pre-authorization may be determined locally by the mobile device A (102a).

Once the pre-authorization is confirmed, the mobile device A (102a) sends the payment account number from the digital wallet (103b) to the POS station (106). For example, the payment account number may be sent using the same wireless protocol described above.

In the third example of determining that the mobile device A (102a) is within the pre-determined range, the computer server (105) is configured to detect that the mobile device A (102a) is within the pre-determined range of the POS station (106). In one or more embodiments, the detection is based on matching known geo-location of the POS station (106) to the geo-location of the mobile device A (102a) tracked by the location aware service (105j). Examples of the location aware service (105j) include services to discover the nearest banking cash machine, personalized weather services, location-based games, etc. that track the geo-location of the consumer A (101a) based on built-in capabilities of the mobile device A (102a) in a cellular communication network, which may be part of the computer network (110). In such example, the mobile device A (102a) and the POS station (106) are not required to include any short range wireless modules (not shown) to support the protocol communication (140).

Once the mobile device A (102a) is detected within the pre-determined range of the POS station (106), the computer server (105) confirms pre-authorization for the mobile device A (102a) to send the geo-fencing payment to the POS station (106)n addition, the geo-location and the identifier of the mobile device A (102a) are tracked by the location aware service (105j). Because mobile device A (102a) is within the pre-determined range of the POS station (106), the geo-location of the mobile device A (102a) can be used to look up known geo-location and identifier of the POS station (106). Accordingly, the computer server (105) first identifies the consumer profile (105a) by matching the tracked mobile device ID to the mobile device ID (105b) in the consumer profile (105a). Then the computer server (105) confirms the pre-authorization if the looked up known geo-location and identifier of the POS station (106) can be found in an entry in the opt-in POS list (105f).

Once the pre-authorization is confirmed, the computer server (105) sends the payment account number (105c) from the consumer profile (105a) to the POS station (106). In particular, the payment account number is sent via the computer network (110).

Using any of the three example schemes described above, when it is determined that mobile device A (102a) is within the pre-determined range of the POS station (106) that has also received the security code and the payment account number, the logic module (120) is configured to submit, to the computer server (105), the merchandise order (134) that includes a payment amount of the merchandise based on the merchandise price (135), the received payment account number (133), and the received security code (132). In addition, the merchandise order (134) may also include a unique order identifier and identifier/geo-location of the POS station (106). In one or more embodiments, the merchandise order (134) is in the form of a secured token.

In response to submitting the merchandise order (134), an authorization is received by the logic module (120) from the computer server (105) to release the merchandise to the consumer A (101a). For the case in which the POS station (106) is a self-service station, such as a self-checkout counter or a vending machine, the merchandise is released via the merchandise dispenser (123) located adjacent to the keypad (121) or the biometric sensor (122). For the case in which the POS station (106) is operated by the human attendant (104), the computer server (105) sends the consumer picture (105d) from the consumer profile (105a) to be displayed to the human attendant (104) using the POS station (106). Accordingly, the merchandise is released to the consumer A (101a) by the human attendant (104) based on visually matching the consumer picture (105d) and the consumer A (101a).

Consistent with the description above, the computer server (105) includes the order processor (105h) that is configured to authenticate the geo-fencing payment by matching the payment account number and the security code contained in the merchandise order (134) to the content of a consumer profile, such as the payment account number (105c) and the security code (105e) stored in consumer profile (105a). Once authenticated, the geo-fencing payment authorization is sent by the order processor (105h) to the POS station (106) to release the purchased merchandise.

As noted above, multiple consumers may be detected to be within the pre-determined range of geo-fencing payment from the POS station (106). For example, in addition to the consumer A (101a), the consumer B (101b) may also be detected when the consumer A (101a) is inputting the security code and the identifier of the merchandise. In this example, a second payment account number may be received by the POS station (106) from the mobile device B (102b). In one or more embodiments, payment account numbers from both mobile devices are included in the merchandise order (134) along with the security code. In this case, the authorization by the computer server (105) is further in response to determining that the second payment account number from the mobile device B (102b) and the received security code (132) do not match based on any consumer profile stored in the computer server (105). In one or more embodiments, instead of a single merchandise order (134) including multiple payment account numbers, a separate merchandise order (not shown) is submitted to the computer server (105) in addition to the merchandise order (134). Specifically, this additional merchandise order is submitted when the second payment account number is received from mobile device B (102b) within the aforementioned time window of receiving the security code and the identifier of the merchandise. In response, this second merchandise order is rejected by the computer server (105) based on determining that the second payment account number from the mobile device B (102b) and the received security code (132) do not match based on any consumer profile stored in the computer server (105).

Once the correct payment account number is accepted while the incorrect payment account number is rejected, the payment gateway (105g) sends the authenticated payment account number and other payment information from the merchandise order (134) to a payment settlement network (not shown) so that the merchant will get paid.

Figure 2:
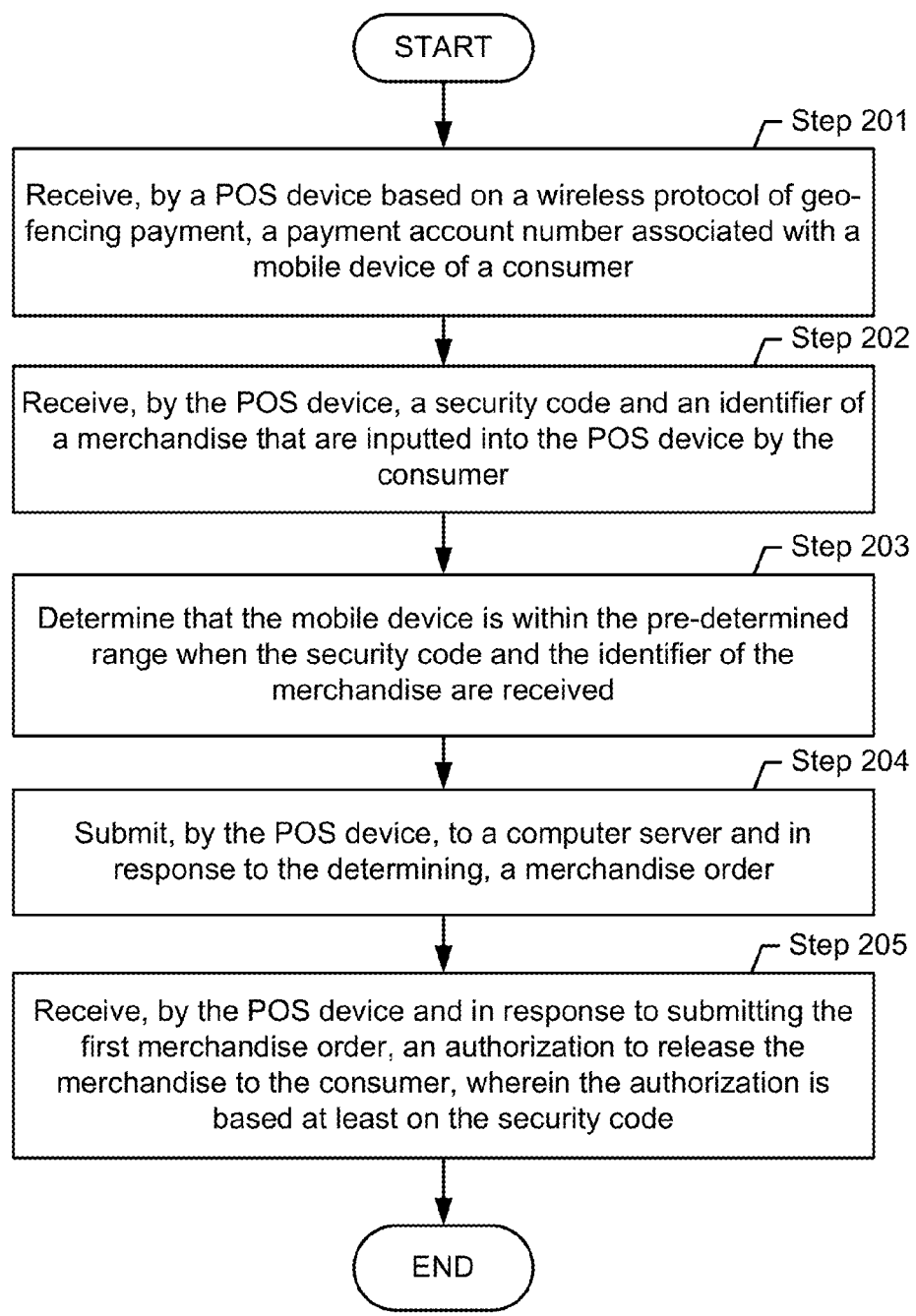
FIG. 2 shows a flowchart of a method of secured geo-fencing with multi-form authentication in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

Initially in Step 201, a first payment account number associated with a first mobile device of a first consumer is receive by a point-of-sale (POS) device based on a wireless protocol of geo-fencing payment. In one or more embodiments, the wireless protocol may be a Bluetooth protocol, a WiFi-Direct protocol, or a protocol used by a location based service. Specifically, the wireless protocol of the geo-fencing payment notifies the POS device when the first mobile device enters and exits a pre-determined distance/range (e.g., 1 m, 10 m, 100 m, etc. referred to as a geo-fence) specified by the wireless protocol. Based on this wireless protocol, the first payment account number is sent automatically to the POS device without user intervention when the first mobile device is within the pre-determined range of the POS device. In one or more embodiments, the first payment account number is sent only if the first consumer has previously opted-into the POS device for using geo-fencing payment.

In Step 202, a security code and an identifier of a merchandise are received by the POS device. In one or more embodiments, the security code may be an alphanumeric code or a biometric signal. Specifically, the security code and the identifier of the merchandise are inputted into the POS device by the first consumer. In one or more embodiments, the POS device is a vending machine where the security code is keyed in using a keypad on the vending machine or captured using a biometric sensor on the vending machine. Further, the identifier of the merchandise is inputted either using the keypad or using dedicated selection buttons of the vending machine. In one or more embodiments, the POS device is a self-checkout counter where the security code is inputted using a keypad or biometric sensor of the self-checkout counter and the identifier of the merchandise is scanned in using a scanner of the self-checkout counter. In one or more embodiments, the POS device is a checkout counter operated by a human attendant (e.g., cashier) where the security code is inputted using a consumer keypad or a biometric sensor of the checkout counter by the first consumer and the identifier of the merchandise is inputted with the help of the human attendant. For example, the identifier of the merchandise may be keyed in using a cashier keypad or scanned in using a scanner of the checkout counter.

In Step 203, it is determined that the first mobile device is within the pre-determined range when the security code and the identifier of the merchandise are received. Specifically, the determination is based on the wireless protocol of the geo-fencing payment. As noted above, the wireless protocol allows the POS device to be notified when the first mobile device (and therefore the first consumer) enters and exits the pre-determined range. Said in other words, it is determined in Step 203 that the security code and the identifier of the merchandise are received prior to the mobile device exiting the pre-determined range. Examples of determining that the mobile device is within the pre-determined range are described in reference to FIG. 1 above. In each example, the payment account number is sent to the POS device. When there are multiple mobile devices within the pre-determined range, more than one payment account number may be sent to the POS device. Generally, one of these multiple payment account numbers will be authenticated based on the security code inputted while the corresponding mobile device is still within the pre-determined range. Said in other words, the security code and the payment account number received by the POS device are matched for authentication before the mobile device associated with the payment account number exits the pre-determined range. The use of the security code to authenticate the correct payment account number is described in Steps 204 and 205 below.

In Step 204, in response to the determination in Step 203, a first merchandise order is submitted by the POS device to a computer server. Specifically, the first merchandise order includes a payment amount of the merchandise, the first payment account number, and the security code. In addition, the first merchandise order may also include a unique order identifier and identifier/geo-location of the POS device.

In Step 205, in response to submitting the first merchandise order in Step 204, an authorization is received by the POS device from the computer server to release the merchandise to the first consumer. Specifically, the authorization is received from the computer server in response to processing the geo-fencing payment to pay for the first merchandise based on the first payment account number. In particular, the geo-fencing payment is authenticated by matching the first payment account number and the security code based on a first consumer profile of the first consumer stored in the computer server. In one or more embodiments, the first payment account number and the security code are pre-stored in the first consumer profile when the first consumer opted-in the POS device for using geo-fencing payment.

As noted above, when there are multiple mobile devices within the pre-determined range of the POS device, more than one payment account number may be sent to the POS device. For example, a second payment account number may have also been received in Step 201 from a second mobile device of a second consumer. In particular, the second consumer is within the pre-determined range of the POS device while the first consumer is inputting the security code and the identifier of the merchandise in Step 202 and Step 203.

In one or more embodiments, the first merchandise order also includes the second payment account number in Step 204. Because the security code is inputted by the first consumer, it is generally not associated with the second payment account number in any record or consumer profile. Accordingly, the authorization to release the merchandise to the first consumer instead of to the second consumer is based on determining that the second payment account number and the security code do not match based on any consumer profile stored in the computer server.

In one or more embodiments, instead of the first merchandise order including multiple payment account numbers, a second merchandise order is submitted to the computer server in addition to the first merchandise order. Specifically, the second merchandise order includes the payment amount of the merchandise, the second payment account number, and the security code. As noted above, the security code is generally not associated with the second payment account number in any record or consumer profile. Accordingly, the second merchandise order is rejected by the computer server. Said in other words, the authorization to release the merchandise to the first consumer instead of to the second consumer is based on determining that the second payment account number and the security code do not match based on any consumer profile stored in the computer server.

In the example where the POS device is a vending machine or a self service checkout counter, the first consumer retrieves the merchandise from a merchandize dispenser adjacent to the aforementioned keypad or biometric sensor. Because the first consumer is in front of the vending machine or the self service checkout counter when inputting the security code, the first consumer is physically situated to retrieve the merchandise from the merchandise dispenser.

In the example where the POS device is a checkout counter operated by a human attendant, a picture of the first consumer retrieved from the first consumer profile is sent to the checkout counter to be displayed to the human attendant. Accordingly, the merchandise is released to the first consumer by the human attendant based on visually matching the picture and the first consumer.

Figure 3A:
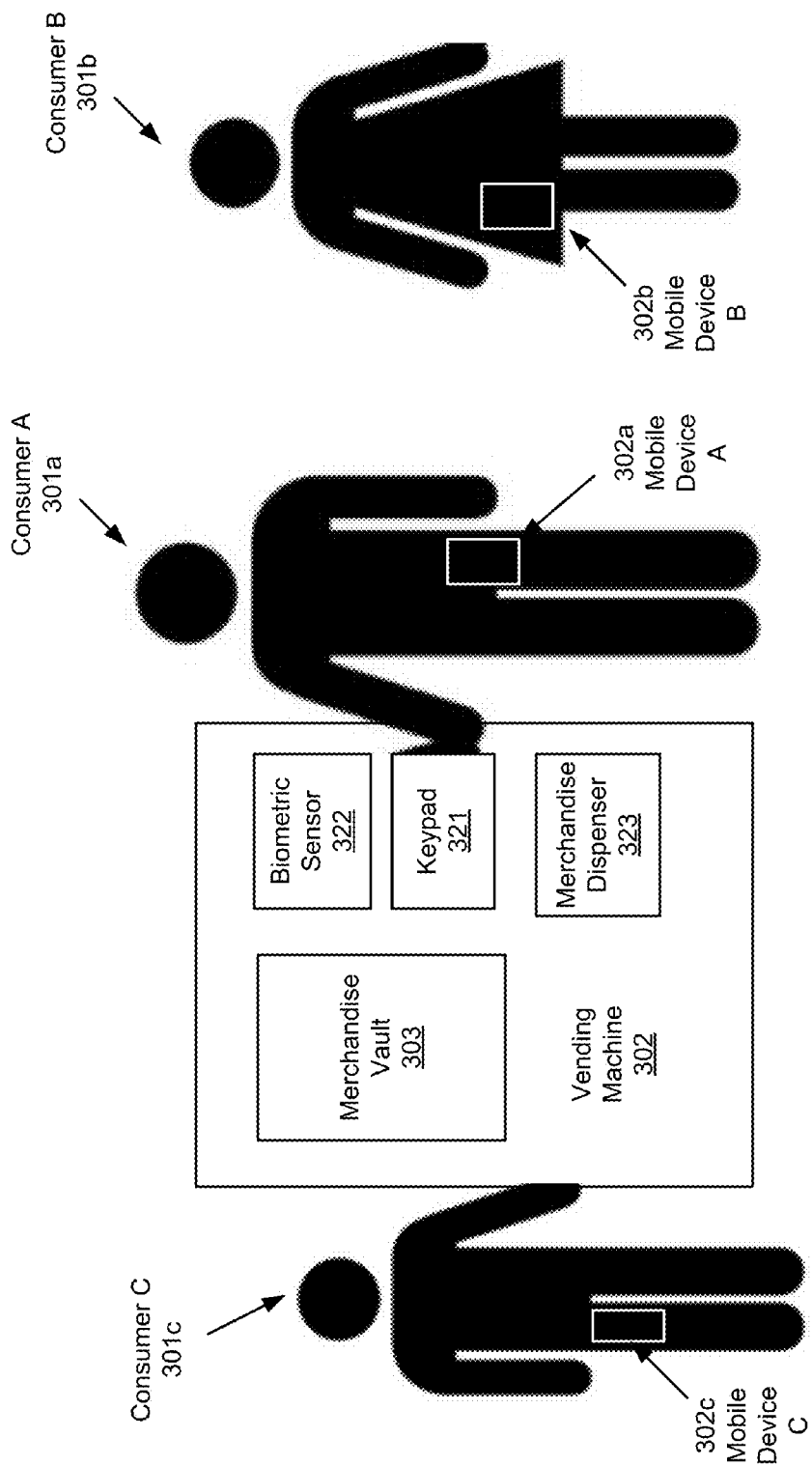
FIGS. 3A-3C shows an example of secured geo-fencing with multi-form authentication in accordance with one or more embodiments of the invention.
Figure 3B:
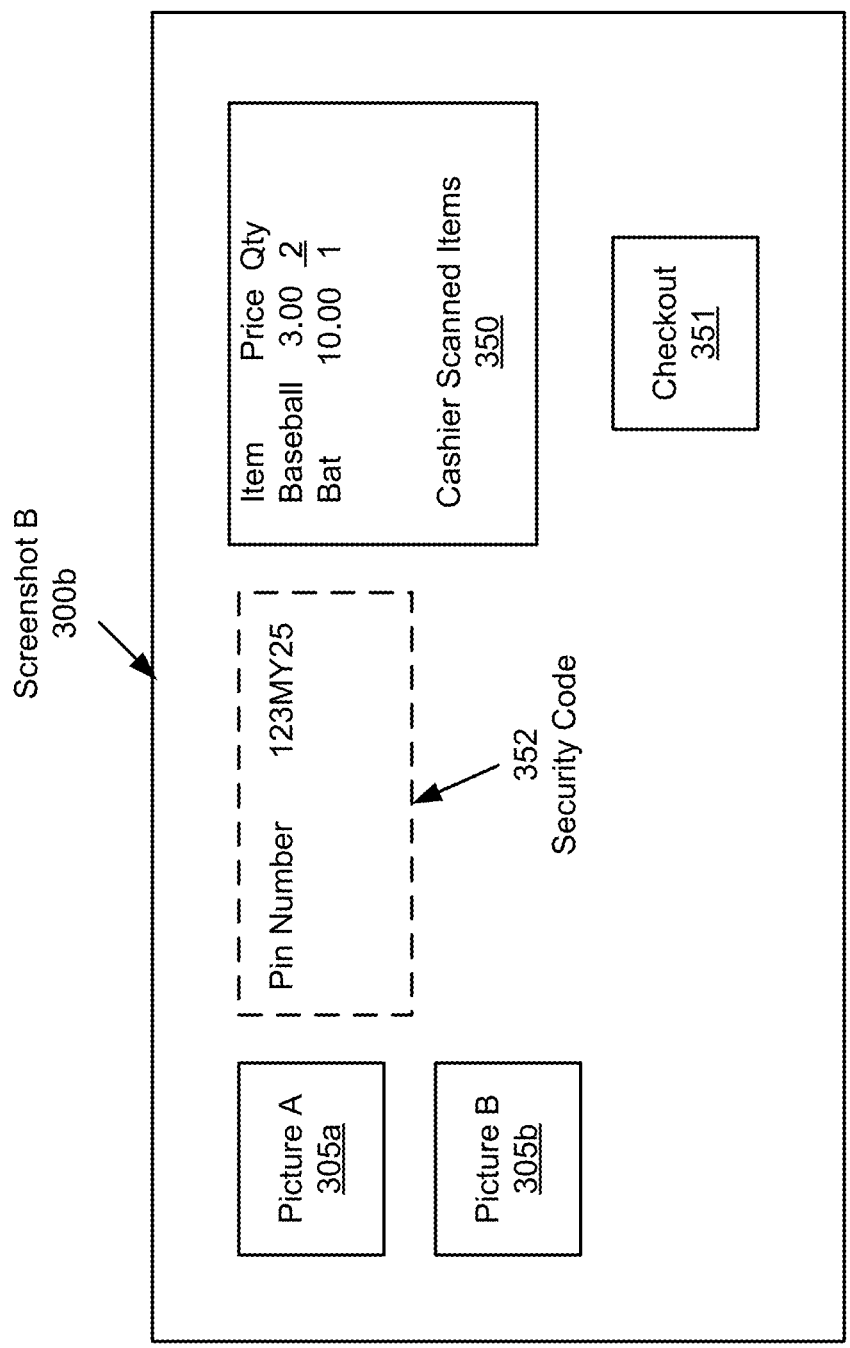
Figure 3C:
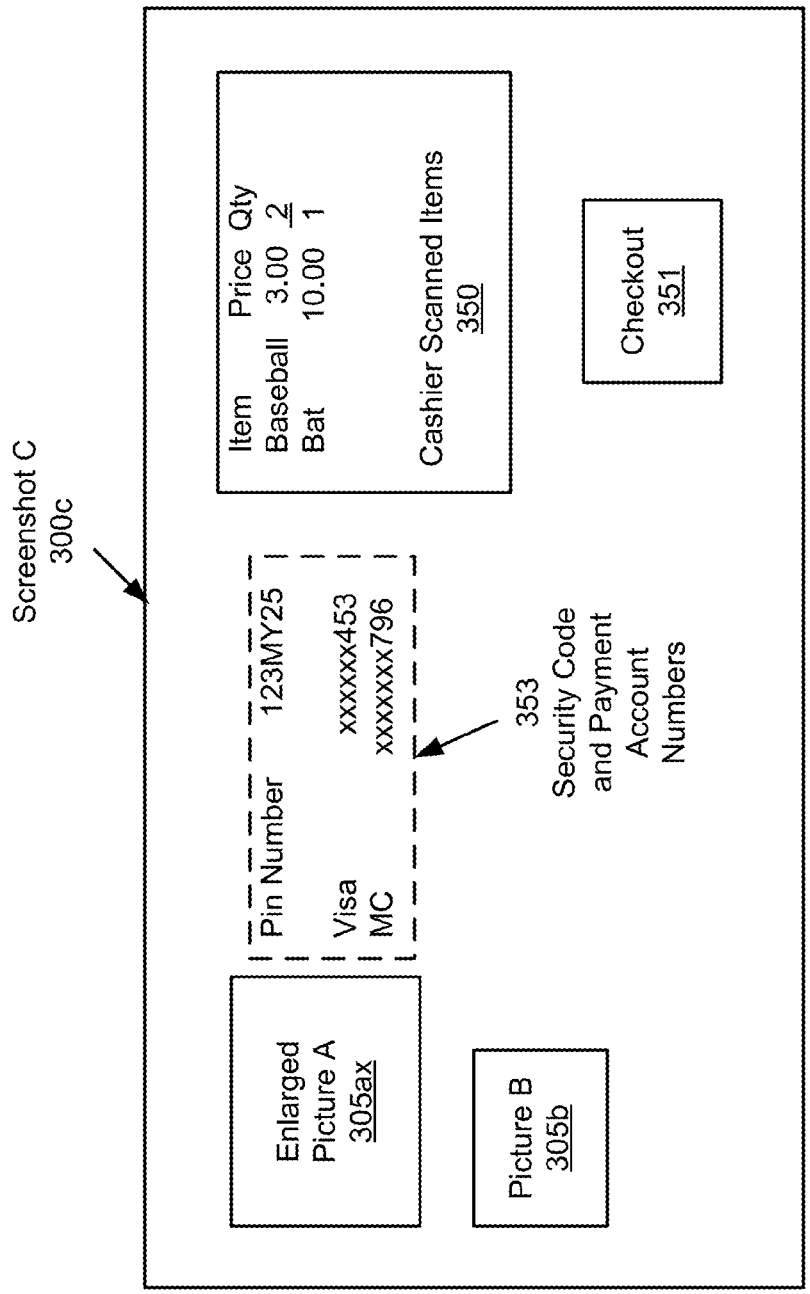

FIGS. 3A-3C show an application example in accordance with one or more embodiments of the invention. This example application may be practiced using the system (100) of FIG. 1 and based on the method described with respect to FIG. 2 above.

The example shown in FIG. 3A relates to a scenario where a consumer A (301a) has an application loaded in the mobile device A (302a) (e.g., smart phone, tablet computer, etc.) for using geo-fencing payment. Similarly, the consumer B (301b) and consumer C (301c) also have their mobile device B (302b) and mobile device C (302c), respectively, pre-loaded with the geo-fencing application. In addition, the vending machine (302) is configured to accept geo-fencing payment from opt-in users. Specifically, the mobile device A (302a), mobile device B (302b), mobile device C (302c), and the vending machine (302) are communicating wirelessly via a cellular network (not shown) with a backend computer server (not shown). In addition, consumer A (301a), consumer B (301b), and consumer C (301c) have opt-in the vending machine (302) for using geo-fencing payments. The geo-fencing application loaded in the mobile devices will grant the vending machine access to the user information, i.e., consumer profiles for the consumer A (301a), consumer B (301b), and consumer C (301c) that are stored on the backend computer server. When the consumer A (301a) is ready to check out a merchandise from the merchandise vault (303) of the vending machine (302), the vending machine (302) prompts the consumer A (301a) for a previously established pin for verification through a keypad (321). Alternatively, the consumer A (301a) may enter a biometric signature via the biometric sensor (322). The backend computer server matches the security pin number or the biometric signature to the consumer profile and also verify the IMEI number of the mobile device A (102a) in order to allow the geo-fencing payment process. Once the geo-fencing payment is authenticated, the vending machine (302) releases the merchandise from the merchandise vault (303) into the merchandise dispenser (323) for the consumer A (301a). While the consumer A (301a) is making the merchandise selection, the consumer B (301b) and the consumer C (301c) are also within the geo-fence surrounding the vending machine (302). Therefore, the vending machine receives the payment account numbers of all three of the consumer A (301a), consumer B (301b), and consumer C (301c) from their respective mobile devices. However, the payment account numbers of consumer B (301b) and consumer C (301c) are rejected by the backend computer server since they will not match the security code from the consumer A (301a). Further, the release merchandise is only physically accessible by the consumer A (301a) due to his position in front of the merchandise dispenser (323).

The example shown in FIGS. 3B and 3C relates to a scenario where the consumer A (301a) and the consumer B (301b) described in the previous example depicted in FIG. 3A have walked into a store (or a pub) and opt-in the store by scanning QR codes displayed on their mobile devices at the store front kiosk. The geo-fencing application will grant the store access to pertinent information in the consumer profiles of the consumer A (301a) and the consumer B (301b) that are stored on the backend computer server. FIG. 3B shows a screenshot B (300b) that is displayed to the cashier attending the checkout counter in the store when consumer A (301a) is ready to check out. As shown, the screenshot B (300b) includes the picture A (305a) and the picture B (305b) that have been retrieved from the consumer profiles of the consumer A (302a) and the consumer B (302b), respectively. In addition, the screenshot B (300b) includes the cashier scanned items (350) showing two items that the consumer A (301a) are checking out as well as the security code (352) entered by the consumer A (301a) at the checkout counter. When the cashier activates the checkout (351) button on the screenshot B (300b), the information regarding the consumers detected by the geo-fencing wireless protocol as present in the store is sent to the backend computer server along with the security code (352) and cashier scanned items (350). Accordingly, the backend computer server matches the security code (352) to the consumer profile of consumer A (301a) and sends an authorization back to the checkout counter. In response, the screenshot B (300b) is refreshed into the screenshot C (300c) on the checkout counter shown in FIG. 3C.

In the screenshot C (300c), the picture A in the screenshot B (300b) has been enlarged into the enlarged picture A (305ax) such that it is clear to the cashier to visually match the enlarged picture and the consumer A (301a) standing in front of the checkout counter to verify. In addition, there are two credit card numbers received from the digital wallet of the mobile device A (302a) of the consumer A (301a). Both credit card numbers are consistent with payment account information in the consumer profile of the consumer A (301a) stored in the backend computer server. Accordingly, the two credit card numbers together with the security code provided by consumer A (301a) are displayed as the security code and payment account numbers (353). The cashier may then ask consumer A (301a) regarding which credit card to use for the payment.

Figure 4:
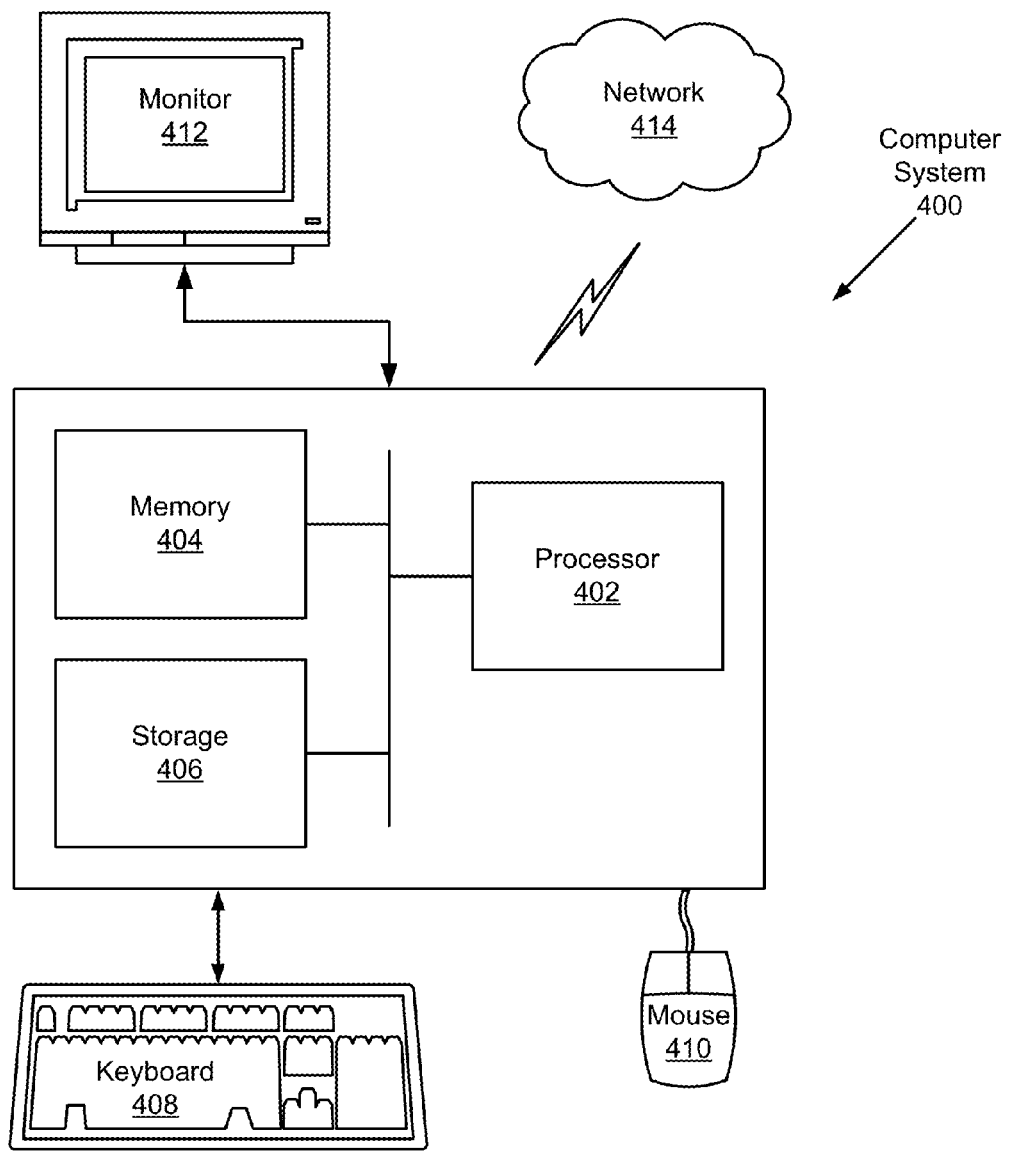
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (414). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for authenticating a geo-fencing payment, comprising:
 receiving, by a point-of-sale (POS) device based on a wireless protocol of the geo-fencing payment, a first payment account number associated with a first mobile device of a first consumer, wherein the first payment account number is sent automatically to the POS device without user intervention when the first mobile device is within a pre-determined range of the POS device, wherein the pre-determined range is based on the wireless protocol of the geo-fencing payment;

receiving, by the POS device, a security code and an identifier of a merchandise that are inputted into the POS device by the first consumer;

determining that the first mobile device is within the pre-determined range when the security code and the identifier of the merchandise are received;

submitting, by the POS device, to a computer server and in response to the determining, a first merchandise order comprising a payment amount of the merchandise, the first payment account number, and the security code; and receiving, by the POS device and in response to submitting the first merchandise order, an authorization to release the merchandise to the first consumer, wherein the authorization is received from the computer server in response to processing the geo-fencing payment to pay for the first merchandise based on the first payment account number, and wherein the geo-fencing payment is authenticated by matching the first payment account number and the security code based on a first consumer profile of the first consumer stored in the computer server.

2. The method of claim 1, further comprising:
receiving, by the POS device based on the wireless protocol, a second payment account number from a second mobile device of a second consumer, wherein the second consumer is within the pre-determined range of the POS device while the first consumer is inputting the security code and the identifier of the merchandise, wherein the first merchandise order further comprises the second payment account number, and wherein the authorization is received from the computer server further in response to determining that the second payment account number and the security code do not match based on any consumer profile stored in the computer server.

3. The method of claim 1, further comprising:
receiving, by the POS device based on the wireless protocol, a second payment account number from a second mobile device of a second consumer, wherein the second consumer is within the pre-determined range of the POS device while the first consumer is inputting the security code and the identifier of the merchandise;

submitting, by the POS device to the computer server, a second merchandise order comprising the payment amount of the merchandise, the second payment account number, and the security code; and receiving, by the POS device and in response to submitting the second merchandise order, a rejection of the second merchandise order, wherein the rejection is received from the computer server in response to determining that the second payment account number and the security code do not match based on any consumer profile stored in the computer server.

4. The method of claim 1, further comprising:
detecting, by the POS device based on the wireless protocol, the first mobile device within the pre-determined range;

confirming, by the POS device in response to the detecting, pre-authorization to accept the geo-fencing payment from the first mobile device, wherein the pre-authorization is based on an identifier of the first mobile device; and requesting, by the POS device in response to the confirming, a payment method from the first mobile device, wherein the first payment account number is stored in a digital wallet of the first mobile device and sent by the first mobile device in response to the request.

5. The method of claim 1, further comprising:
detecting, by the first mobile device based on the wireless protocol, the POS device when the first mobile device is within the pre-determined range; and confirming, by the first mobile device in response to the detecting, pre-authorization to send the geo-fencing payment to the POS device, wherein the pre-authorization is based on a geo-location of the first mobile device, wherein the first payment account number is stored in a digital wallet of the first mobile device and sent by the first mobile device in response to the confirming.

6. The method of claim 1, further comprising:
detecting, by the computer server based on the wireless protocol, that the first mobile device is within the pre-determined range of the POS device; and confirming, by the computer server in response to the detecting, pre-authorization for the first mobile device to send the geo-fencing payment to the POS device, wherein the pre-authorization is based on a geo-location and an identifier of the first mobile device, wherein the first payment account number is stored in the first consumer profile and sent to the POS device by the computer server in response to the confirming.

7. The method of claim 1, wherein the security code comprises at least one selected from a group consisting of an alphanumeric code inputted from a keypad of the POS device and a biometric signal captured by a biometric sensor of the POS device.

8. The method of claim 1, wherein the wireless protocol of the geo-fencing payment comprises at least one selected from a group consisting of a Bluetooth protocol, a WiFi-Direct protocol, and a location based service.

9. The method of claim 1,
wherein the POS device is a self-service station, and
wherein the first consumer retrieves the merchandise from a merchandize dispenser adjacent to an input device for receiving the security code and the identifier of the merchandise from the first consumer.

10. The method of claim 1, further comprising:
receiving, by the POS device, a picture of the first consumer retrieved from the first consumer profile;

displaying the picture to a human attendant of the POS device, wherein the merchandise is released to the first consumer by the human attendant based on matching the picture and the first consumer.

11. A system for authenticating a geo-fencing payment, comprising:
a first mobile device of a first consumer, configured to send the geo-fencing payment;

a point-of-sale (POS) device coupled to a computer server and configured to:
receive, based on a wireless protocol of the geo-fencing payment, a first payment account number from a first mobile device, wherein the first payment account number is sent to the POS device automatically without user intervention when the first mobile device is within a pre-determined range of the POS device, wherein the pre-determined range is based on the wireless protocol of the geo-fencing payment;

receive a security code and an identifier of a merchandise that are inputted into the POS device by the first consumer;

determine that the first mobile device is within the pre-determined range when the security code and the identifier of the merchandise is received;

submit, to a computer server and in response to the determining, a first merchandise order comprising a payment amount of the merchandise, the first payment account number, and the security code; and receive, from the computer server and in response to submitting the first merchandise order, an authorization to release the merchandise to the first consumer; and the computer server configured to process the geo-fencing payment by:

authenticating the geo-fencing payment by matching the first payment account number and the security code based on a first consumer profile of the first consumer stored in the computer server; and sending the authorization in response to processing the geo-fencing payment based on the first payment account number to pay for the first merchandise.

12. The system of claim 11, the POS device being further configured to:

receive, based on the wireless protocol, a second payment account number from a second mobile device of a second consumer, wherein the second consumer is within the pre-determined range of the POS device while the first consumer is inputting the security code and the identifier of the merchandise, wherein the first merchandise order further comprises the second payment account number, and wherein sending the authorization by the computer server is further in response to determining that the second payment account number and the security code do not match based on any consumer profile stored in the computer server.

13. The system of claim 11, the POS device being further configured to:

receive, based on the wireless protocol, a second payment account number from a second mobile device of a second consumer, wherein the second consumer is within the pre-determined range of the POS device while the first consumer is inputting the security code and the identifier of the merchandise;

submit, to the computer server, a second merchandise order comprising the payment amount of the merchandise, the second payment account number, and the security code; and receive, in response to submitting the second merchandise order, a rejection of the second merchandise order, wherein sending the rejection by the computer server is in response to determining that the second payment account number and the security code do not match based on any consumer profile stored in the computer server.

14. The system of claim 11, the POS device being further configured to:

detect, based on the wireless protocol, the first mobile device within the pre-determined range;

confirm, in response to the detecting, pre-authorization to accept the geo-fencing payment from the first mobile device, wherein the pre-authorization is based on an identifier of the first mobile device; and request, in response to the confirming, a payment method from the first mobile device, wherein the first payment account number is stored in a digital wallet of the first mobile device and sent by the first mobile device in response to the request.

15. The system of claim 11, the first mobile device being further configured to:

detect, based on the wireless protocol, the POS device when the first mobile device is within the pre-determined range; and confirm, in response to the detecting, pre-authorization to send the geo-fencing payment to the POS device, wherein the pre-authorization is based on a geo-location of the first mobile device, wherein the first payment account number is stored in a digital wallet of the first mobile device and sent by the first mobile device in response to the confirming.

16. The system of claim 11, the computer server being further configured to:

detect, based on the wireless protocol, that the first mobile device is within the pre-determined range of the POS device; and confirm, in response to the detecting, pre-authorization for the first mobile device to send the geo-fencing payment to the POS device, wherein the pre-authorization is based on a geo-location and an identifier of the first mobile device, wherein the first payment account number is stored in the first consumer profile and sent to the POS device by the computer server in response to the confirming.

17. The system of claim 11, wherein the POS device comprises at least one selected from a group consisting of a keypad and a biometric sensor, wherein the security code comprises at least one selected from a group consisting of an alphanumeric code inputted from the keypad and a biometric signal captured by the biometric sensor, and wherein the wireless protocol of the geo-fencing payment comprises at least one selected from a group consisting of a Bluetooth protocol, a WiFi-Direct protocol, and a location based service.

18. The system of claim 11, wherein the POS device is a self-service station, comprising:

an input device for receiving the security code and the identifier of the merchandise from the first consumer; and a merchandise dispenser, adjacent to the input device, for releasing the merchandise.

19. The system of claim 11, wherein the computer server is further configured to send a picture of the first consumer retrieved from the first consumer profile, wherein the POS device is further configured to display the picture to a human attendant of the POS device, and wherein the merchandise is released to the first consumer by the human attendant based on matching the picture and the first consumer.

20. A non-transitory computer readable medium storing instructions for authenticating a geo-fencing payment, the instructions, when executed by a computer processor, comprising functionality to:

receive, by a point-of-sale (POS) device based on a wireless protocol of the geo-fencing payment, a first payment account number associated with a first mobile device of a first consumer, wherein the first payment account number is sent automatically to the POS device without user intervention when the first mobile device is within a pre-determined range of the POS device, wherein the pre-determined range is based on the wireless protocol of the geo-fencing payment;

receive, by the POS device, a security code and an identifier of a merchandise that are inputted into the POS device by the first consumer;

determine that the first mobile device is within the pre-determined range when the security code and the identifier of the merchandise are received;

submit, by the POS device, to a computer server and in response to the determining, a first merchandise order comprising a payment amount of the merchandise, the first payment account number, and the security code; and receive, by the POS device and in response to submitting the first merchandise order, an authorization to release the merchandise to the first consumer, wherein the authorization is received from the computer server in response to processing the geo-fencing payment to pay for the first merchandise based on the first payment account number, and wherein the geo-fencing payment is authenticated by matching the first payment account number and the security code based on a first consumer profile of the first consumer stored in the computer server.

* * * * *